United States Patent
Margulies et al.

(10) Patent No.: US 6,183,832 B1
(45) Date of Patent: Feb. 6, 2001

(54) COCRPTB ALLOYS WITH INCREASED BORON CONTENT AND METHOD OF PRODUCING SAME

(75) Inventors: David Thomas Margulies, Gilroy; Ernesto Esteban Marinero, Saratoga; Hal Jervis Rosen, Los Gatos; Kurt Alan Rubin, Santa Clara; Brian Rodrick York, San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/173,476

(22) Filed: Oct. 14, 1998

(51) Int. Cl.$^7$ .................................................. G11B 5/66

(52) U.S. Cl. ................. 428/65.3; 428/65.7; 428/336; 428/694 T; 428/694 TS; 428/694 TM; 428/900; 427/128; 427/129; 427/130; 204/192.2

(58) Field of Search ................ 428/694 T, 694 TS, 428/694 TM, 900, 336, 65.3, 65.7; 204/191.2; 427/128–130

(56) References Cited

U.S. PATENT DOCUMENTS

| | | | |
|---|---|---|---|
| 5,478,661 | 12/1995 | Murayama | 428/842 |
| 5,494,722 | 2/1996 | Oka et al. | 428/65.3 |
| 5,523,173 | 6/1996 | Doerner et al. | 428/611 |

OTHER PUBLICATIONS

Tani, N. et al, "High coercivity hard disk with CoCrPtB/Cr media", IEEE, 27(6), pp. 4736–4738, 1991.

Song, L.W. et al., "Magnetic properties and recording performance of multilayer films of CoCrTa, CoCrPtTa, and CoCrPtTa with CoCrPtB", IEEE, 30(6), pp. 4011–4013, 1994.

Glijer, P. et al., "Structural design of CoCrPt(Ta,B)/Cr magnetic thin film media for ultra high density longitudinal magnetic recording", Pergamon, 33(10/11), pp. 1575–1584, 1995.

Glijer, P. et al., "Magnetic force microscopy (MFM) studies of micromagnetic structures of high coercivity CoCrPt/Cr and CoCrPtBCr thin films", IEEE, 31(6), pp. 2842–2844, 1995.

Primary Examiner—Leszek Kiliman
(74) Attorney, Agent, or Firm—Lumen Intellectual Property Services

(57) ABSTRACT

A magnetic layer structure with a layer of cobalt-chromium-platinum-boron composite alloy containing 10% to 20% B in the magnetic layer. The useful magnetic properties of the magnetic layer structure are achieved by the incorporation of a nucleation layer prior to the deposition of the magnetic layer. The resultant magnetic layer structures have coercivity $H_c$ values in between 2,000 and 5,000 Oe, grain sizes between 30 and 200 Angstroms and anisotropic crystallographic orientation with the c-axis of the cobalt-chromium-platinum-boron in the plane of the medium. These magnetic layer structures are suitable for magnetic data storage devices including magnetic disks.

21 Claims, 6 Drawing Sheets

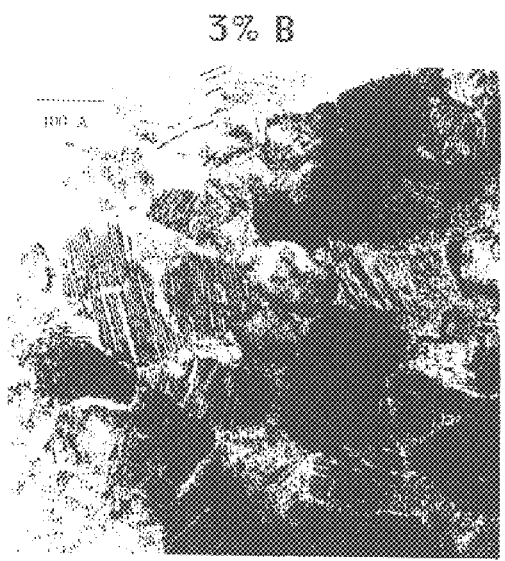 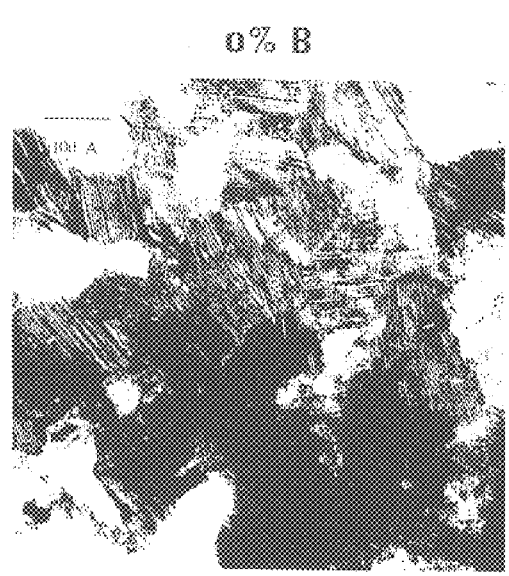
FIG. 2b
FIG. 2a

COCRPTB ALLOYS WITH INCREASED BORON CONTENT AND METHOD OF PRODUCING SAME

FIELD OF THE INVENTION

This invention relates generally to magnetic alloy layer structures used for high density magnetic data storage media, such as rigid magnetic recording disks, and in particular to magnetic layer structures comprised of a layer of CoCrPtB alloy.

BACKGROUND

Advances in high density magnetic storage systems depend largely on improvements in the magnetic data storage media. The properties of the media are determined by the composition and the structure of the active magnetic storage material and contiguous layers within the media structure. For high density longitudinal recording media the important characteristics are coercivity, signal-to-noise ratio, remanent magnetization, coercivity squareness, layer thickness and surface roughness.

It is known, for longitudinal magnetic recording with a ring head that the linear recording density (LARD) of the magnetic media is governed by the following relationship:

$$LRD\ 1/a$$

where a is a parameter given approximately by the relation:

$$a \cong \sqrt{\frac{M_r \cdot t \cdot d}{\pi \cdot H_c}}$$

where $M_r$ is the remnant magnetization, t is the thickness of the magnetic layer, d is the distance from the pole tip bottom of the magnetic write or read device to the top of the magnetic layer and $H_c$ is the coercivity. Furthermore, it has also been established that the output is related to $M_r$ and t as follows:

$$OUTPUT\ M_r \cdot t$$

where $M_r \cdot t$ is called the magnetization thickness product. Hence, in designing a magnetic data storage media having a high recording density, it is necessary to increase $H_c$ while maintaining a low $M_r t$ value that is still sufficient for the required output application. According to prior art, to support longitudinal magnetic recording at densities close to 10 Gbit/inch$^2$ the coercivity $H_c$ of the magnetic media must range between 2,500–4,500 Oe and the material grain size should be approximately 100 Angstroms; Glijer et al., "Structural Design of CoCrPt(Ta,B)/Cr Magnetic Thin Film Media for Ultra High Density Longitudinal Magnetic Recording", Scripta Metallurgica et Materialia, Vol. 33, Nos. 10/11, 1995, pp. 1575–84.

Small grain sizes are important for the next generation magnetic data storage media because small grain sizes can significantly increase the media signal to noise ratio (SNR). The media SNR is a ratio of the output signal over media noise, and can be described by the equation;

$$SNR\ WB/D^2$$

Here W is the track width, B is the bit size and D is the in-plane grain diameter of the active magnetic layer. Hence, the SNR of the magnetic media varies inversely as the square of the in-plane grain diameter and a significant reduction in the magnetic media noise can be achieved by reducing the grain size.

Traditionally, making magnetic data storage media involves coating magnetic particles in a resin or binder. Recent efforts to achieve high density magnetic media have focused on thin layer alloy magnetic structures. The thin layer alloy magnetic media are made by several methods including sputtering, vapor deposition, ion-beam deposition and electroplating.

Thus far, the most successful thin layer magnetic alloy materials for data storage are based on cobalt-chromium alloys with additions of platinum, tantalum, boron and alloys thereof. Examples of such magnetic media are described by Murayama et al. in U.S. Pat. No. 5,478,661, by Oka et al. in U.S. Pat. No. 5,494,722 and by N. Tani et al. in "High Coercivity Hard Disk with CoCrPtB/Cr Media", IEEE Transactions on Magnetics, Vol. 27, No. 6, November 1991, pp. 4736–38. The composite alloys, described in the references above, are generally deposited on a chromium or a chromium alloy under-layer with a body-centered-cubic (bcc) crystal lattice structure. Additionally, the chromium or the chromium alloy under-layer usually has a substantial [100] or [110] crystallographic orientation normal to the plane of the deposition substrate. This [100] or [110] crystallographic orientation of the bcc chromium or chromium alloy is well known in the art to be a useful under-layer for subsequent deposition of cobalt based alloys.

Cobalt-chromium-platinum with additions of less than 7% boron (% here and throughout this text is understood to mean atomic percent) are particularly useful for longitudinal magnetic recording media. Addition of boron to cobalt-chromium-platinum composite alloys has been proposed to enhance the anisotropic growth on the chromium under-layer causing some grains to be oriented with the c-axis in the plane of the film. However, this has not been observed for all compositions of cobalt-chromium-platinum alloys. Achieving this preferred orientation is important for these materials to be used in high density longitudinal magnetic media because the c-axis is the easy direction to magnetize and, therefore, it is preferably to have grains with their c-axes parallel to the plane (in-plane) of the longitudinal media for efficient write and read operations.

The addition of boron (less than 7 atomic %) to the composite alloy cobalt-chromium-platinum also increases the coercivity $H_c$ and the signal to noise ratio of the magnetic media as recognized by Doerner et al. in U.S. Pat. No. 5,523,173 where additions of 2–10 percent of B have been examined; M. Oka et al., U.S. Pat. No. 5,494,722. Further studies of this alloy have also been published by L. W. Song et al. in "Magnetic Properties and Recording Performance of Multi-layer Films of CoCrTa, CoCrPtTa, and CoCrPtTa with CoCrPtB", IEEE Transactions on Magnetics, Vol. 30, No. 6, November 1994, pp. 4011–13; P. Glijer et al. in "Magnetic Force Microscopy (MFM) Studies of Micromagnetic Structures of High Coercivity CoCrPt/Cr and CoCrPtB/Cr Thin Films", IEEE Transactions on Magnetics, Vol. 31, No. 6, November 1995, pp. 2842–2844.

Prior art teaches the advantages of cobalt-chromium-platinum-boron composite alloys containing less than 10% boron for magnetic structures deposited on bcc chromium or chromium alloy under-layers with substantial [100] or [110] crystallographic orientation normal to the plane of the deposition substrate. The benefits include, anisotropic grain growth (for some composition alloys) with the c-axis along in plane, increases in coercivity, and improved signal-to-noise ratio. There is a continued need to discover new compositions of magnetic materials for high density longitudinal magnetic media that have smaller grain size for improved signal to noise ratios while maintaining the high coercivity values.

OBJECTS AND ADVANTAGES

Accordingly, it is a primary object of the present invention to disclose a new magnetic recording media comprised of a layer of CoCrPtB containing B>10% and a method for producing the same. The advantages of the magnetic layer structure are high coercivity $H_c$ values and reduced grain sizes.

Increasing the boron content from 10 to 20% in the CoCrPtB composite alloys to decrease grain sizes while maintaining useful magnetic properties is accomplished by providing a nucleation layer of Co composite alloy, where B<10, between a magnetic layer of CoCrPtB composite alloy, where B>10%, and bcc metal or bcc metal alloy under-layer having substantially [100] or [110] crystallographic orientation normal to the plane of the deposition substrate. The resultant grains of the magnetic structure are well defined and isolated. The magnetic structures described have high coercivities ($H_c$), greater than 2,000 Oe, and have the crystallographic c-axis of the magnetic layer in-plane of the bcc metal or metal alloy under-layer. Additional objects and advantages of the invention are set forth in the specification.

SUMMARY

These objects and advantages are attained by depositing a bcc metal or bcc metal alloy under-layer on a suitable substrate. The preferred under-layer is chromium or chromium alloy that is deposited with a negative bias voltage applied to the substrate. Typically the substrate is a rigid disk that is aluminum or aluminum coated with a plated nickel phosphorus over coating but can also be glass, silicon, ceramic, quartz or any substrate suitable for deposition. A nucleation layer of a Co alloy, where B≦10% and ranging from 1 to 50 Angstroms in thickness is deposited on top of the bcc metal or alloy under-layer. A layer comprising of CoCrPtB, where B>10% and ranging from 5 to 500 Angstroms in thickness is deposited on the nucleation layer, thus providing a magnetic layer structure. The under-layer, the nucleation layer and the magnetic layer can be deposited by sputtering, ion-beam deposition and laser deposition.

The bcc metal or bcc alloy under-layer presents a template for the subsequent depositions of a cobalt or cobalt alloy layer such that the cobalt or cobalt alloy layer will grow epitaxially to the bcc metal or bcc alloy under-layer with the c-axis residing in the plane of the film. The under-layer is preferably deposited with [100] or [110] crystallographic orientation. The nucleation layer provides a means for a compatible growth surface between the bcc metal or metal alloy under-layer and the Co composite alloy with B>10%. The magnetic structure with a magnetic layer of CoCrPtB alloy, where B>10% also has small grain sizes with the crystallographic c-axis oriented in the plane of the structure surface.

The magnetic films of this invention have grain sizes between 20 and 200 Angstroms. The grains are well defined and segregated by an amorphous phase. In the applications of magnetic structures of this invention, such as longitudinal magnetic recording media, the magnetic layer contains grains that are ferromagnetic. Furthermore, the magnetic layer structures produced by this invention have a high magnetic coercivity ($H_c$) between 2,000 and 5,000 Oe. The invention is described in detail in the below detailed description in reference to the appended drawing figures.

DETAILED DESCRIPTION

Figure 1:
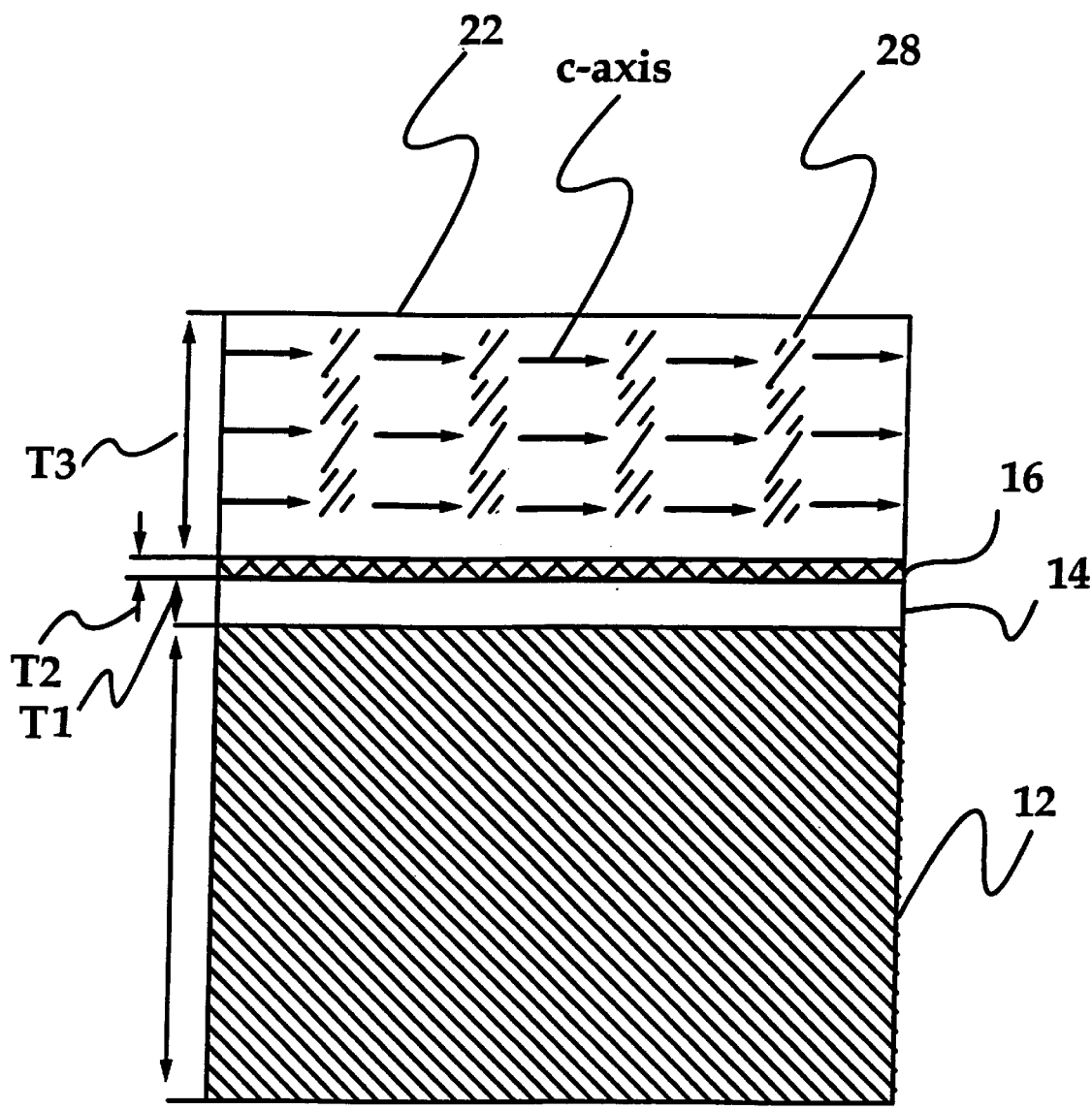
FIG. 1 is a cross sectional view showing a film of a CoCrPtB alloy made with a nucleation layer according to the invention.

A layered magnetic structure of this invention is visualized in FIG. 1. A substrate 12 is a flat surface or a rigid disk that is aluminum or aluminum plated with a nickel phosphorus over coating, but can also be glass, silicon, quartz, ceramic or any other substrate that is suitable for deposition. If a substrate other than nickel phosphorus coated aluminum disk is used, a preparatory layer maybe necessary to make the substrate suitable for depositing a bcc metal or a bcc metal alloy layer 14. For example, if glass is the substrate a nickel-aluminum layer is coated on the glass prior to depositing an under-layer 14.

The preferred under-layer 14 is chromium or a chromium-titanium alloy. A negative bias voltage is typically applied to the substrate during the deposition of the under-layer 14. The conditions under which the under-layer 14 is deposited, including pressure, temperature and bias voltage, will affect the magnetic properties of the resultant magnetic films. Conditions are chosen so that the under-layer 14 is deposited with a substantial [100] or [110] crystallographic orientation providing an epitaxial growth surface for subsequent deposition growth steps. The thickness T1 of the under-layer 14 optimized to obtain the desirable magnetic properties and is preferably in the range of 10 to 1000 Angstroms.

A nucleation layer 16, is a Cobalt alloy preferably with a composition of $CoCr_xPt_yB_z$, where $15 \leq x \leq 40$, $0 \leq y \leq 15$ and $0 \leq z \leq 10$ atomic percent and $25 \leq (x+y+z) \leq 50$. The preferred thickness T2 of the nucleation layer 16 is 1 to 50 Angstroms. The nucleation layer 16 provides nucleation sites for a subsequent deposition of a $CoCr_xPt_yB_z$ layer 22 containing B>10%.

The magnetic layer 22 layer is deposited on layer 16 and is composed of $CoCr_xPt_yB_z$, wherein $0 \leq x \leq 30$, $0 \leq y \leq 40$ and $10 \leq z \leq 25$ atomic percent and $25 \leq (x+y+z) \leq 60$. The layer 22 is preferably 5 to 500 Angstroms in thickness T3. The under-layer 12, the nucleation layer 16, the magnetic layer 22 are deposited by sputtering, ion-beam deposition or laser deposition methods.

Figure 2D:
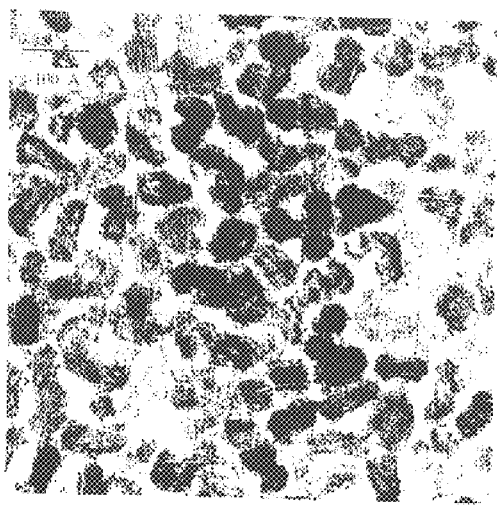
FIG. 2 (a–d) are TEM images showing the grain structure in the CoCrPtB composite alloy containing 0% B, 3% B, 6% B and 12% B.
Figure 2C:
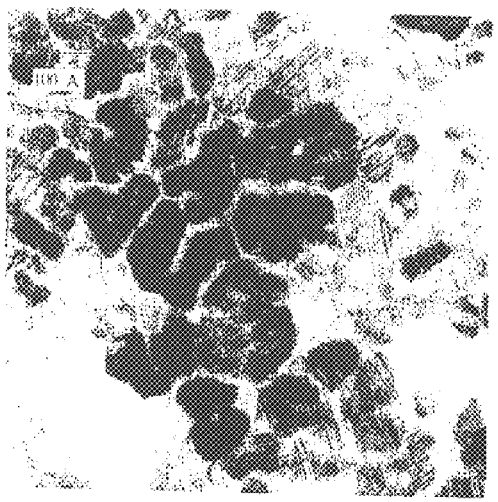

FIGS. 2 (a–d) display the plan view TEM images of the surfaces of the magnetic structures made according to the invention. FIGS. 2 (a–d) are magnetic layer structures made with a magnetic layer 22 of CoCrPtB, where B=0, 3, 6, and 12% boron, respectively. For this example, the magnetic layer 22 is comprised of $[(Co_{71}Cr_{17}Pt_{12})B]$ and the nucleation layer 16 is comprised of $Co_{71}Cr_{17}Pt_{12}$. The grains are isolated by an amorphous phase 28 (see FIG. 1) in the TEM images. Additionally, the grain sizes are reduced by almost an order of magnitude with the inclusion of boron from 0 to 12% in the magnetic layer.

Figure 3:
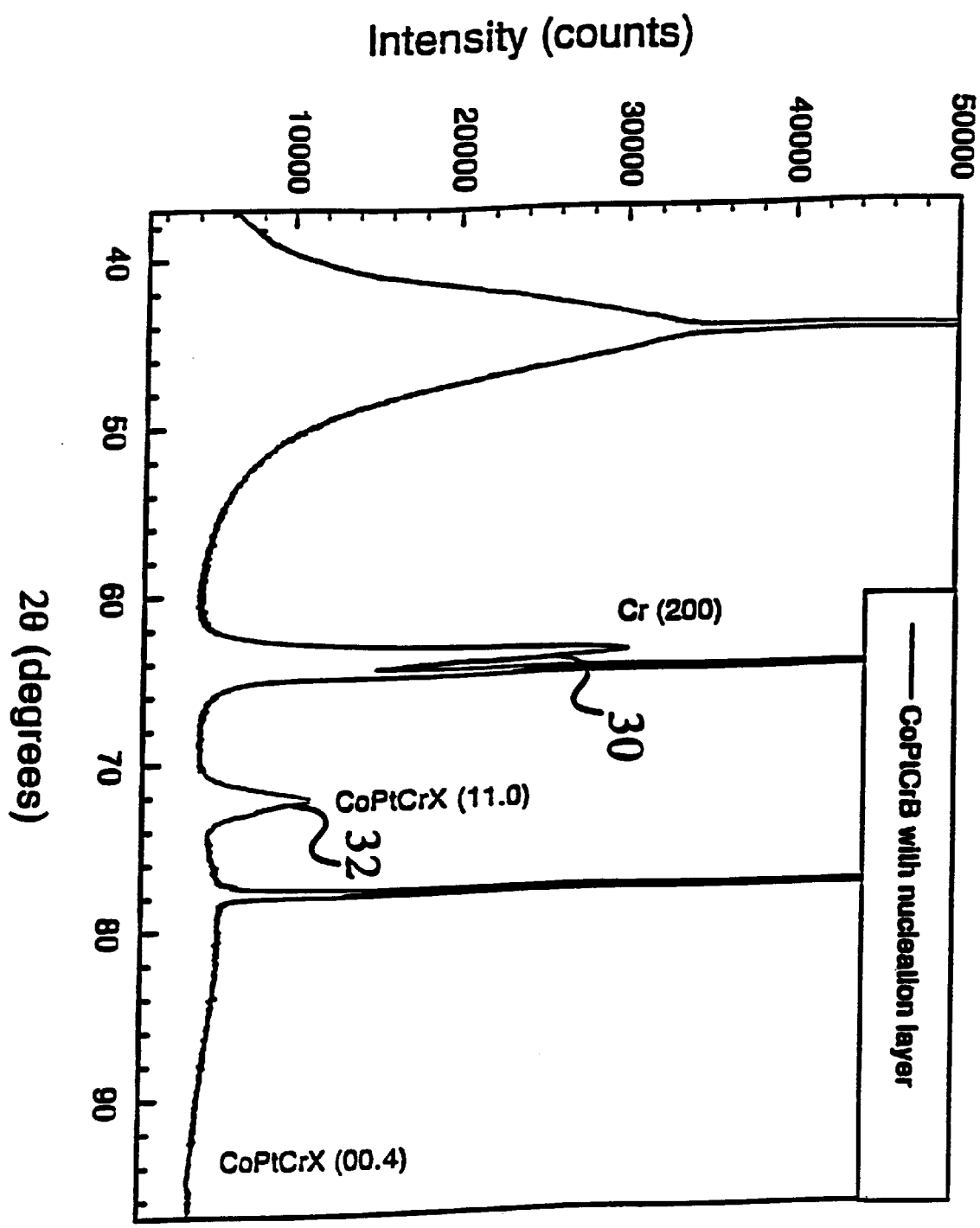
FIG. 3 is a graph of the X-ray data of the magnetic structure $Co_{71}Cr_{17}Pt_{12}$ and 12% B deposited on a $Co_{71}Cr_{17}Pt_{12}$ nucleation layer.

FIG. 3 is the X-ray analysis of a magnetic layer structure of FIG. 1 comprising the magnetic layer 22 composed of [(Co$_{71}$Cr$_{17}$Pt$_{12}$)B] with B=12% and the nucleation layer 16 composed of (Co$_{71}$Cr$_{17}$Pt$_{12}$). The X-ray data of this structure reveal a strong reflection at 2θ≅72 deg 32 corresponding to the [110] crystallographic planes the of the hexagonally-close-packed cobalt-chromium based alloy. The [110] reflection is observed when grains of the magnetic layer 22 are oriented with the c-axis parallel to the plane (in-plane) of the magnetic recording media; as stated previously, this is the preferred orientation.

Figure 4:
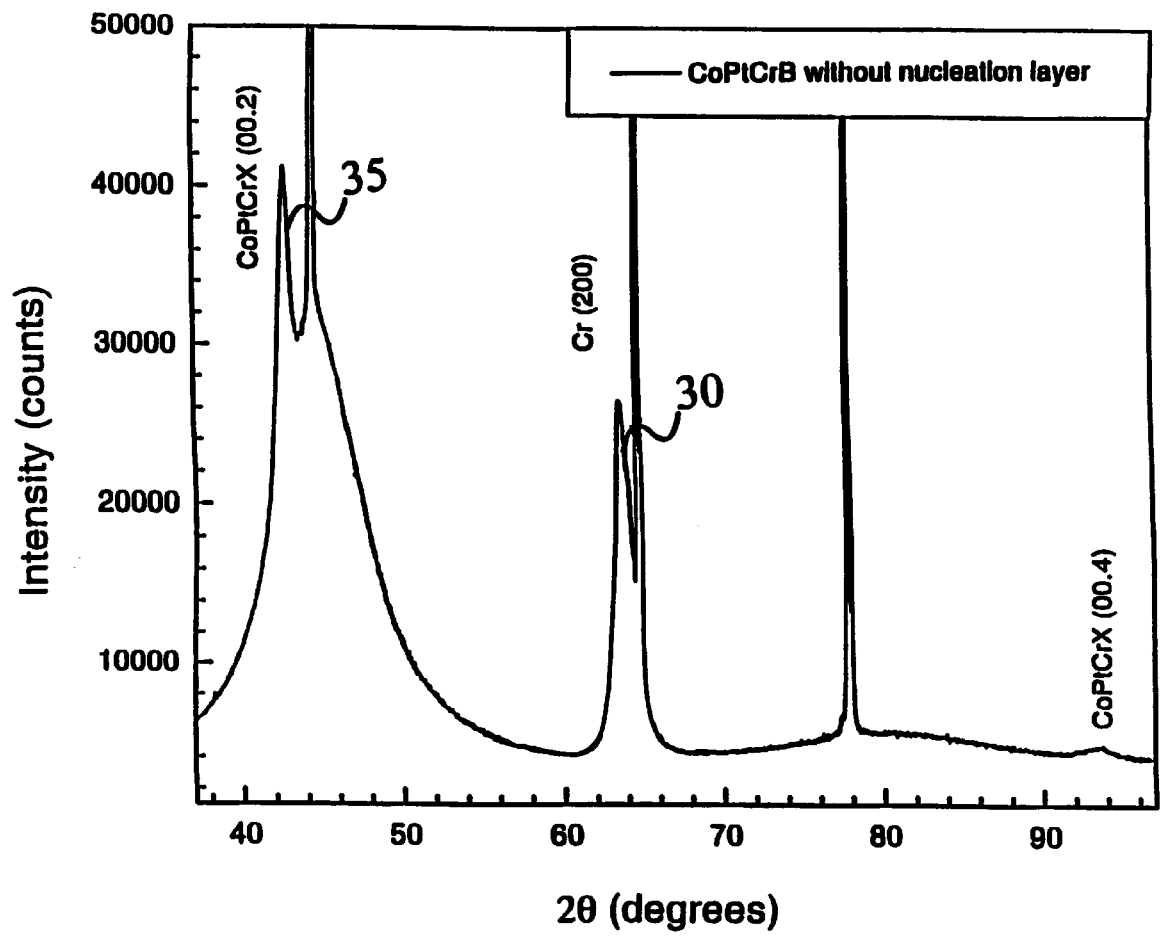
FIG. 4 is a graph of the X-ray data of the magnetic structure $Co_{71}Cr_{17}Pt_{12}$ and 12% B deposited without a nucleation layer.

FIG. 4 is the X-ray analysis of a magnetic layer structure with magnetic layer composition of [(Co$_{71}$Cr$_{17}$Pt$_{12}$)B] with B=12% but without a nucleation layer 16. The absence of a refection at 2θ≅72 deg 32 and the presence of a strong refection at 2θ≅42 deg 35, corresponding to the [002] crystallographic planes of the cobalt-chromium-platinum alloy, shows that the grains of the magnetic layer 22 are predominantly aligned with the c-axis perpendicular to longitudinal plane of the magnetic media. Perpendicular orientation of the c-axis is not preferred for longitudinal magnetic media because of reasons stated previously.

Additionally, FIGS. 3–4 display that both X-ray data sets have strong peak at 2θ≅64 deg 30 correspond to the [200] crystallographic planes of the chromium under-layer that are deposited with bias voltage of −450 Volts applied to the substrate. The presence of a peak at 2θ≅64 deg signify that the bcc under-layers have substantially [100] or [110] crystallographic orientation normal to the plane of the substrate.

Figure 5:
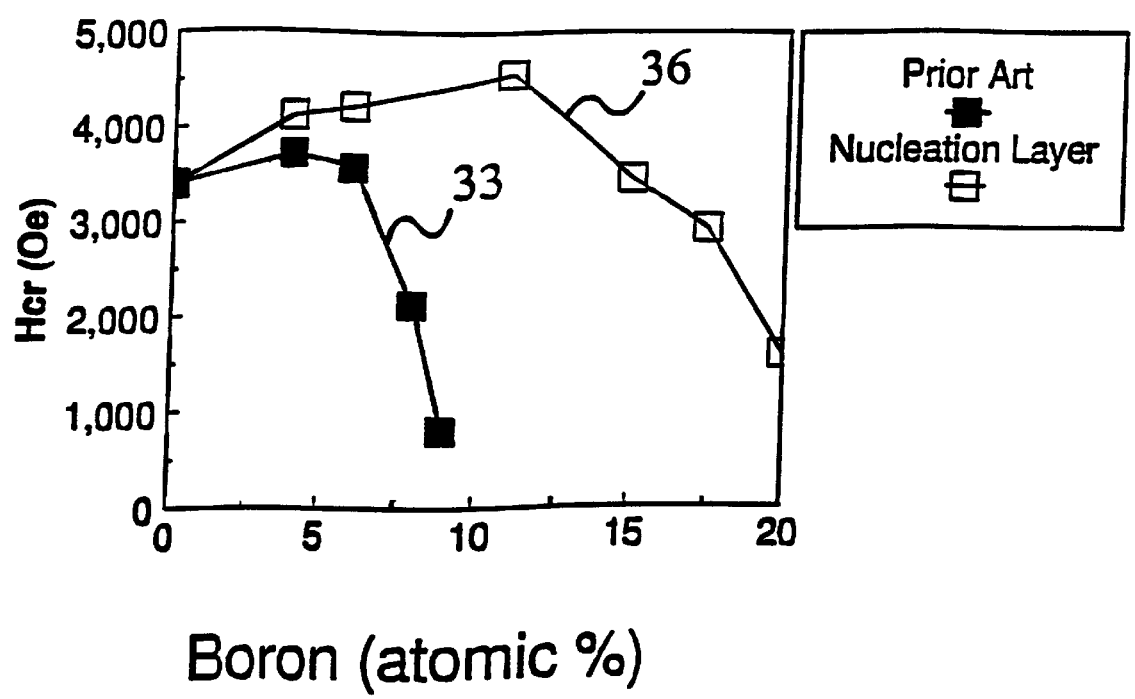
FIG. 5 is a graph comparing the coercivities $H_c$ of magnetic structures made of a CoCrPtB composite alloys by methods in prior art and made of a CoCrPtB composite alloys according to the invention.

FIG. 5 plots coercivity H$_c$ values of magnetic layer structures with ranges of boron percent in the magnetic layer 22 without a nucleation layer and with a nucleation layer 16. All samples contain a chromium under-layer deposited with bias voltage of −450 Volts applied to the substrate. For these examples, the magnetic layers 22 are composed of [(Co$_{71}$Cr$_{17}$Pt$_{12}$)B] B=12 atomic %. For samples measured in curve 36, the nucleation layer 16 is composed of (Co$_{71}$Cr$_{17}$Pt$_{12}$). The coercivity curve versus percent boron 33 shows that the coercivity values for magnetic layer structures containing CoCrPtB alloy decrease rapidly as the boron percent exceeds 7% when the nucleation layer 16 is not incorporated in the fabrication. The coercivity curve 36 shows that the coercivity values of layered magnetic structures containing CoCrPtB alloy increase with addition of boron up to 12 atomic % when the nucleation layer 16 is incorporated in the fabrication process. After 12% incorporation of boron into magnetic layer 22 the coercivity decreases even with a nucleation step. However, magnetic structures produced by the invention continue to have useful magnetic properties up to 20% boron because of the relatively high coercivity values and the reduced signal to noise ratio achieved by the small grain sizes.

Based on the above description, a person of ordinary skill in the art will be able to make a magnetic layer structure comprised of a layer of CoCrPtB containing boron in excess of 10 atomic % useful for high density longitudinal magnetic media. Additionally, anyone of ordinary skill in the art will appreciate that many variations and alterations to the above details are within the scope of the invention. For example, the invention can include a plurality of magnetic layers with B>10% or additional layers could be deposited on the substrate prior to depositing the bcc metal or bcc metal alloy under-layer. Therefore, the following preferred embodiment of the invention is set forth without any loss of generality to, and without imposing limitations upon, the claimed invention.

What is claimed is:

1. A magnetic recording medium comprising a magnetic layer 10 to 50 Angstroms thick, said magnetic layer comprising a Co alloy comprising Cr$_x$, Pt$_y$, and B$_z$ wherein 0≦x≦30, 0≦y≦40 and 10≦z≦25 atomic percent, and 25≦(x+y+z)≦60, said magnetic layer having a coercivity value ranging between 2000 and 5000 Oe.

2. The medium of claim 1 wherein said magnetic layer is a magnetic layer in a multi-layer magnetic structure.

3. A magnetic recording medium comprising:
   a) a substrate;
   b) a metal under-layer on said substrate said, under-layer having a body-centered-cubic lattice structure;
   c) a Co alloy nucleation layer deposited on said under-layer wherein said Co alloy nucleation layer is 1 to 50 Angstroms thick;
   d) a magnetic layer deposited on said Co alloy nucleation layer, said magnetic layer comprising a Co alloy comprising Cr$_x$, Pt$_y$, and B$_z$ wherein 0≦x≦30, 0≦y≦40 and 10≦z≦25 atomic percent, and 25≦(x+y+z)≦60.

4. The medium of claim 3 wherein said substrate is selected from the group consisting aluminum with a plated nickel phosphorus coating, glass, silicon, ceramic and quartz.

5. The medium of claim 3 wherein said media substrate is a disk substrate.

6. The medium of claim 3 wherein said under-layer is selected from the group consisting of chromium, ruthenium, chromium alloy and ruthenium alloy.

7. The medium of claim 6 wherein said under-layer has a substantially crystallographic [100] orientation.

8. The medium of claim 6 wherein said under-layer has a substantially crystallographic [110] orientation.

9. The medium of claim 6 wherein said under-layer is deposited by a process selected from the group consisting of sputtering, ion-beam deposition and laser deposition.

10. The medium of claim 3 wherein said Co alloy nucleation layer is comprised of CoCr$_x$Pt$_y$B$_z$, wherein 15≦x≦40, 0≦y≦15 and 0≦z≦10 atomic percent, and 25≦(x+y+z)≦50.

11. The medium of claim 10 wherein said magnetic layer contains grain sizes ranging from 20 to 200 Angstroms.

12. The medium of claim 11 wherein said magnetic layer has a thickness ranging from 5 to 500 Angstroms.

13. The medium of claim 12 wherein said magnetic layer is deposited by a process selected from the group consisting of sputtering, ion-beam deposition and laser deposition.

14. The medium of claim 6 wherein said medium has a coercivity value ranging between 2000 and 5000 Oe.

15. A method for making a magnetic storage medium comprising:
   a) providing a substrate;
   b) depositing on said substrate an under-layer selected from the group consisting of chromium, ruthenium, chromium alloy and ruthenium alloy;
   c) depositing on said under-layer a nucleation layer comprising a Co alloy comprising Cr$_x$, Pt$_y$, and B$_z$ wherein 15≦x≦40, 0≦y≦15 and 0≦z≦10 atomic percent, and 25≦(x+y+z)≦50;
   d) and depositing on said nucleation layer a magnetic layer comprising a Co alloy comprising Cr$_x$, Pt$_y$, and B$_z$ wherein 0≦x≦30, 0≦y≦40 and 10≦z≦25 atomic percent, and 25≦(x+y+z)≦60.

16. The method of claim 15 wherein providing said substrate comprises providing a substrate selected from the group consisting of aluminum with a plated nickel phosphorus coating, glass, silicon, ceramic and quartz.

17. The method of claim 15 wherein said nucleation layer is deposited to a thickness ranging from 1 to 100 Angstroms.

18. The method of claim 15 wherein said nucleation layer is deposited by a process selected from the group consisting of sputtering, ion-beam deposition and laser deposition.

19. The method of claim 15 wherein said magnetic layer is deposited to a thickness ranging from 5 to 500 Angstroms.

20. The method of claim 15 wherein said magnetic layer is deposited by a process selected from the group consisting of sputtering, ion-beam deposition and laser deposition.

21. The method of claim 15 wherein depositing said under-layer includes applying a negative electrical bias to said substrate.

* * * * *